April 15, 1969   C. MOEHLING   3,438,339
RAILWAY TRUCK BOLSTER HYDRAULICALLY SNUBBED
Filed Dec. 15, 1967

INVENTOR.
CHARLES MOEHLING
BY Russell W. Pyle
Walter F. Schlegel, Jr.
ATT'YS

United States Patent Office 3,438,339
Patented Apr. 15, 1969

3,438,339
RAILWAY TRUCK BOLSTER HYDRAULICALLY SNUBBED
Charles Moehling, Arlington Heights, Ill., assignor to Amsted Industries Incorporated, Chicago, Ill., a corporation of Delaware
Filed Dec. 15, 1967, Ser. No. 691,058
Int. Cl. B61d 5/06
U.S. Cl. 105—197                                      3 Claims

ABSTRACT OF THE DISCLOSURE

An hydraulic shock absorbing or snubbing device is located between the top or compression member of each side frame and the bolster of a railway car truck. In order to accommodate the snubber in this position, the bolster is provided with a cavity beneath each side frame and a recessed area in its bottom wall. A corresponding recess is provided in the side frame spring seat, such that the load carrying spring between the recessed areas is lowered.

---

This invention relates to railway truck arrangements and more particularly to an arrangement for accommodating a snubber between the compression member of each side frame and the bolster of a railway car truck, in order to reduce rocking motions transmitted from the truck to the car body supported thereon.

During the operation of some railway vehicles having car bodies supported upon two or more car trucks, rail irregularities have been found to cause excessive rocking of the car body. Various proposals to overcome this problem have included the provision of snubbing devices between the body and truck or snubbing devices within the truck alone. In truck arrangements employing the latter concept, however, space limitations have deterred the development of an effective truck arrangement, and it is an object of this invention to overcome this problem by the provision of a highly compact roll stabilizing arrangement in a railway truck.

Figure 1:
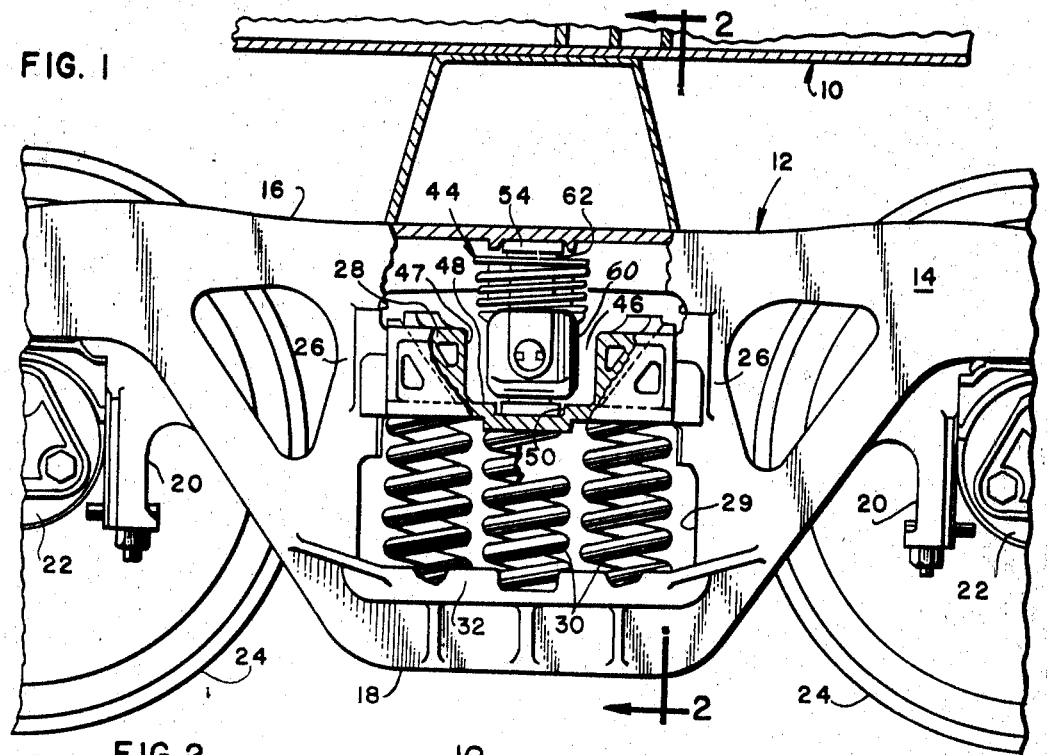
Figure 2:
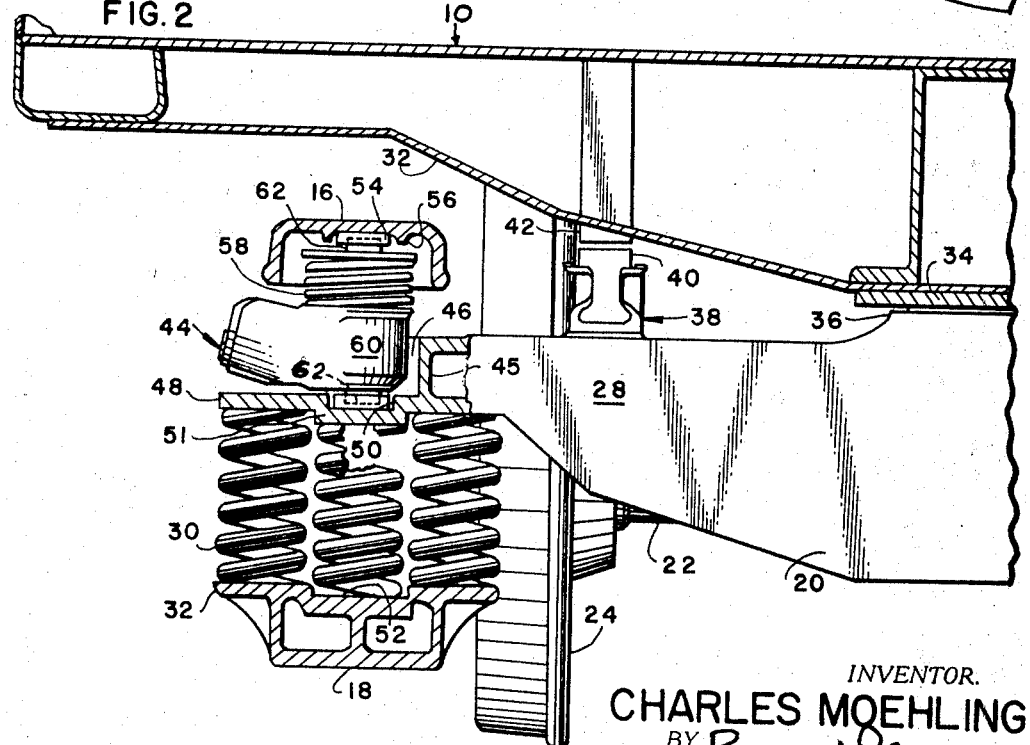

Other objects will become apparent to those skilled in the art from the following description taken in connection with the accompanying drawing wherein:

FIGURE 1 is a side view, with certain parts broken away and conventional parts shown in outline, of a railway car truck that incorporates the features of the presently described invention; and FIGURE 2 is a transverse fragmentary view, partly in cross section, taken substantially along section line 2—2 of FIGURE 1, with only one side of the vehicle being shown, it being understood that the other side is substantially identical to that portion shown.

With more particular reference to the drawing, the railway vehicle shown comprises a car body 10 supported upon a car truck 12. The car truck 12 includes a pair of spaced side frames, one of which is shown at 14, each comprising a substantially horizontal top or compression member 16 and a bottom or tension member 18 sloping up at both ends and merging with the compression member to define pedestals 20. Axles 22, to which wheels 24 are secured, are rotatably mounted in the pedestals 20.

The compression member 16 and tension member 18 are separated by a pair of spaced vertical columns 26 which together define a window 29 to accept one end of a bolster 28. The bolster 28 is supported upon spring groups 30 which rest upon a spring seat 32 on the tension member 18 of the side frame 14.

As best shown in FIGURE 2, the car body 10 comprises a car bolster 32 having a center plate 34, which rests upon the center plate 36 of the truck bolster 28. Side bearings 38 having pads or rollers 40 are mounted at both sides of the truck bolster 28 and are engageable with corresponding bearing surfaces 42 on the car bolster 32.

As the wheels 24 of the truck encounter alternate vertical irregularities in the underlying rails, this motion is transmitted to the car body 10 and may cause the car body to rock from side to side. This condition is greatly amplified if the wheels 24 pass over rail irregularities at appropriate times in the roll cycle, and the side bearings 38 and 42 may engage with considerable force.

The present invention contemplates the provision of suitable snubbing means 44 between the bolster 28 and the compression member 16 of the side frame to minimize the undesirable rocking condition stated above. As shown, the bolster 28 is provided with a cavity 46 near each end thereof beneath the side frame compression member, the bottom of said cavity being defined by the bottom wall 48 of the bolster. The bolster cavity 46 is open to the exterior at the outboard side thereof, thereby facilitating insertion and removal of the snubber 44. The sides of the cavity 46 are defined by an inboard internal wall 45 (FIG. 2) interconnecting a pair of spaced internal vertical walls 47 (FIG. 1), all of which internal walls extend upwardly from the bolster bottom wall 48.

I claim:
1. In a railway car truck having spaced side frames each comprising a lower tension member and an upper compression member and having spaced springs seated on each tension member and a bolster having its ends supported on said springs, the improvement comprising:
  a cavity formed in each end portion of the bolster, said cavity having an open top and open outboard end and having a portion only of its interior area depressed, thereby providing a recess in the upper surface of the bottom wall of the bolster and a corresponding protrusion on the under surface thereof,
  a downwardly depressed area providing a recess in the upper surface of the tension member vertically aligned with said first named recess and substantially similar in area thereto,
  one of said springs having its lower end seated in said second recess and its upper end bearing against said protrusion,
  and snubbing means having a lower pin seated in said first named recess and an upper pin seated against the under surface of the compression member for yieldingly resisting upward movement of the bolster relative to the compression member.

2. The improvement claimed in claim 1 in which the springs are coil springs and include springs additional to and of substantially the same height as said named spring, each of said additional springs having its lower end seated against a portion of said tension member above the level of the recess therein and its upper end seated against a portion of said bolster under surface above the level of the protrusion therein.

3. The combination claimed in claim 2 in which the springs are nine in number, disposed in three longitudinally extending rows of three springs each, and said first named spring is the center spring of the center row.

References Cited

UNITED STATES PATENTS

| | | | |
|---|---|---|---|
| 1,457,345 | 6/1923 | Chiles | 105—197 |
| 1,916,083 | 6/1933 | Somervell | 105—197.2 X |
| 1,976,937 | 10/1934 | Haseltine | 267—4 X |
| 2,256,868 | 9/1941 | Perkins | 105—197 |
| 2,424,625 | 7/1947 | Nystrom et al. | 105—197 |
| 2,519,169 | 8/1950 | Beemer et al. | 105—193 |

ARTHUR L. LA POINT, *Primary Examiner.*

HOWARD BELTRAN, *Assistant Examiner.*

U.S. Cl. X.R.

267—3

UNITED STATES PATENT OFFICE
CERTIFICATE OF CORRECTION

Patent No. 3,438,339          Dated April 15, 1969

Inventor(s) Charles Moehling

It is certified that error appears in the above-identified patent and that said Letters Patent are hereby corrected as shown below:

Column 2, after line 37, insert the following:

A rectangular recessed area 50 is provided centrally in the bolster bottom wall directly beneath the side frame compression member 16 for accepting a lower portion of the snubber 44, and a corresponding annular recessed area 52 (Fig. 2) is provided in the spring seat 32 of the side frame tension member 18. It will be noted that the lower annular recessed area 52 is large enough and so located such that one of the springs of spring group 32 rests therein and is lowered thereby relative to the other springs. The recessed area 50 in the bolster bottom wall causes a protrusion 51 on the lower side of said bolster wall, which rests on and compensates for the lowered spring.

The snubber 44 is pinned between the bolster bottom wall 48 and the horizontal internal surface of the side frame compression member 16 by means of hardened inserts 54, one of which is positioned in a rectangular boss 56 in said compression member located opposite the recessed area 50 of said bolster bottom wall, the other being positioned in said recessed area of said bottom wall.

The snubber or shock absorber 44 may be of any suitable type, and preferably includes expanding means, such as a normally compressed spring 58, and means that yieldingly resist upward movements of the ends of the bolster 28 relative to the side frame compression member 16, such as a hydraulic shock absorbing portion 60. The expanding means or spring 58 is required for the embodiment shown, in order to maintain the pin 62 of the device in the hardened inserts.

Signed and sealed this 14th day of September 1971.

(SEAL)
Attest:

EDWARD M.FLETCHER,JR.
Attesting Officer

ROBERT GOTTSCHALK
Acting Commissioner of Patent